(12) United States Patent
Tyou et al.

(10) Patent No.: US 12,355,727 B2
(45) Date of Patent: Jul. 8, 2025

(54) COMMUNICATION TERMINAL DEVICE, COMMUNICATION CONTROL METHOD, AND COMMUNICATION CONTROL PROGRAM

(71) Applicant: NIPPON TELEGRAPH AND TELEPHONE CORPORATION, Tokyo (JP)

(72) Inventors: Iifan Tyou, Musashino (JP); Takahiro Nukushina, Musashino (JP); Masaki Tanikawa, Musashino (JP); Yukio Nagafuchi, Musashino (JP); Shingo Kashima, Musashino (JP); Tetsuhiko Murata, Musashino (JP); Kenji Ota, Musashino (JP); Tsuyoshi Kondo, Musashino (JP); Koki Nomura, Musashino (JP); Akio Mukaiyama, Musashino (JP); Hiroki Nagayama, Musashino (JP); Koji Morishita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 325 days.

(21) Appl. No.: 17/431,713

(22) PCT Filed: Feb. 7, 2020

(86) PCT No.: PCT/JP2020/004871
§ 371 (c)(1),
(2) Date: Aug. 18, 2021

(87) PCT Pub. No.: WO2020/170863
PCT Pub. Date: Aug. 27, 2020

(65) Prior Publication Data
US 2022/0141185 A1 May 5, 2022

(30) Foreign Application Priority Data

Feb. 22, 2019 (JP) .................................. 2019-030887

(51) Int. Cl.
*H04L 29/00* (2006.01)
*H04L 9/40* (2022.01)

(52) U.S. Cl.
CPC ...... *H04L 63/0245* (2013.01); *H04L 63/0236* (2013.01); *H04L 63/0263* (2013.01); *H04L 63/1425* (2013.01)

(58) Field of Classification Search
CPC ............ H04L 63/0245; H04L 63/0236; H04L 63/0263; H04L 63/1425
(Continued)

(56) References Cited

U.S. PATENT DOCUMENTS

| 2015/0163121 | A1  | 6/2015 | Mahaffey et al. |
| 2016/0088520 | A1* | 3/2016 | Oyama ................. H04W 48/18 370/331 |
| 2017/0118089 | A1* | 4/2017 | Hur .................... H04W 52/0283 |

OTHER PUBLICATIONS

Tyou et al., "A Study of Decentralized IoT Security Controller", The Institute of Electronics, Information and Communication Engineers, IEICE Technical Report ICSS2017-58, Mar. 2018, pp. 43-48 (6 pages including English Abstract).
(Continued)

*Primary Examiner* — Brandon Hoffman
*Assistant Examiner* — Michael D Anderson
(74) *Attorney, Agent, or Firm* — XSENSUS LLP

(57) ABSTRACT

A communication terminal apparatus includes processing circuitry configured to collect communication of an application and control the communication of the application based on a first control condition, analyze the communication collected to determine whether the application is a communication control target, and generate the first control
(Continued)

condition based on a normal communication range of the application that is the communication control target, and transmit at least a part of first shared information including identification information about the application and the first control condition to a second communication terminal apparatus that is different from the communication terminal apparatus.

12 Claims, 11 Drawing Sheets

(58) Field of Classification Search
USPC .......................................................... 726/11
See application file for complete search history.

(56) References Cited

OTHER PUBLICATIONS

Bhunia Suman Sankar et al: "Dynamic attack detection and mitigation in IoT using SDN", 2017 27th International Telecommunication Networks and Applications Conference (ITNAC), IEEE, Nov. 22, 2017, pp. 1-6, XP033278982, DOI: 10.1109/atnac.2017.8215418 [retrieved on Dec. 15, 2017].

* cited by examiner

| APPLICATION NAME: VERSION | CONTROL CONDITION |
|---|---|
| A:v1.9 | Packet size {10kB+20%} 50kbyte/packet +-50%, PROTOCOL ={HTTPS} Duration:{CURVE y=x^2+sx+2.5} |
| A:v1.8 | |
| B:v3 | Port={80,443} IP={123.234.45.56} Duration:5min +-10% |
| B:v2.5 | PROTOCOL ={MQTT,HTTPS} |
| C:v1 | NO CONTROL CONDITION BECAUSE COMMUNICATION PATTERN CANNOT BE IDENTIFIED DUE TO USER OPERATION |
| Z:v2 | NO CONTROL CONDITION BECAUSE COMMUNICATION PATTERN CANNOT BE IDENTIFIED DUE TO USER OPERATION |

APPLICATION A → A:v1.9, A:v1.8
APPLICATION B → B:v3, B:v2.5
APPLICATION C → C:v1
APPLICATION Z → Z:v2

Fig. 3

| CONDITION | APPLICATION | POINT OF CONDITIONS | APPLICATION TOTAL POINT |
|---|---|---|---|
| ADVERTISEMENT IS PRESENT | SATISFIED | 8 | 25 |
| BACKGROUND COMMUNICATION IS PRESENT | SATISFIED | 6 | |
| NOTIFICATION IS PRESENT | SATISFIED | 6 | |
| ... | ... | | |

Fig. 7

| CONDITION | CONTROL TARGET OR NOT | NORMAL RANGE |
|---|---|---|
| DEVICE a | True | a.com |
| DEVICE b | True | b.Com, a.com |
| DEVICE c | True | a.com |
| ... | ... | |

Fig. 8

| CONDITION | CONTROL TARGET OR NOT | REMARKS |
|---|---|---|
| DETERMINATION DIFFICULTY BASED ON APPLICATION INFORMATION | MEDIUM | $\alpha < 20$: EASY<br>$20 < \alpha < 40$: MEDIUM<br>$40 < \alpha$: DIFFICULT |
| DETERMINATION IN AUTONOMOUS COORDINATION | EASY<br>b.Com,<br>a.com | $\beta < 0.6$: DIFFICULT<br>$0.6 \leq \beta < 0.9$: MEDIUM<br>$0.9 \leq \beta$: EASY |
| USER DETERMINATION | ? | SELECT "DIFFICULT" WHEN IT IS ASSUMED THAT THE NUMBER OF TARGETS OF TRANSMISSION INCREASES DUE TO USER OPERATION |

Fig. 9

COMMUNICATION TERMINAL DEVICE, COMMUNICATION CONTROL METHOD, AND COMMUNICATION CONTROL PROGRAM

CROSS-REFERENCE TO RELATED APPLICATIONS

The present application is based on PCT filing PCT/JP2020/004871, filed Feb. 7, 2020, which claims priority to JP 2019-030887, filed Feb. 22, 2019, the entire contents of each are incorporated herein by reference.

TECHNICAL FIELD

The present invention relates to a communication terminal apparatus, a communication control method, and a communication control program.

BACKGROUND ART

Systems for analyzing communication packets to identify device types and device names by signature matching, and systems such as a firewall for controlling communication using a blacklist have been proposed. These systems often execute processing based on external information such as signatures and blacklists and thus, may not be able to achieve securing of information sources, rapid response, safety of analysis, and low cost.

Therefore, a method has been proposed in which only devices whose communication pattern is limited, such as Internet of Things (IoT) devices are targeted, and the communication is learned at a gateway (GW) of a network to identify abnormal communication (for example, see Non Patent Literature 1).

CITATION LIST

Non Patent Literature

Non Patent Literature 1 lifan Tyou et al. "A Study of Decentralized IoT Security Controller", IEICE technical report ICSS2017-58 (2018-03)

SUMMARY OF THE INVENTION

Technical Problem

However, because the method is implemented at the GW, the control target is limited to IoT devices that communicate directly with the GW such as Wi-Fi. Accordingly, this method fails to control IoT devices that use, as GWs, applications on smart phones (hereinafter referred to as "applications") that currently occupy most of the markets.

In addition, although a firewall on the OS is contemplated as a method for controlling communication of each application on the smart phone, the firewall only uses existing implementations and thus, hardly satisfies the safety of analysis.

There is also a method of generating a filter condition by analyzing communication for each application. However, smart phone applications are different from existing IoT devices and the like, and in many cases, their targets of transmission are not limited. This is due to the presence of application advertisements and content delivery networks supporting them. Consequently, a communication filter using communication patterns during a learning period frequently causes over-detection that determines normal communication to be abnormal.

Further, because communication of the application changes depending on the analysis period, the environment, and the operation of the user, it is difficult to learn all the ideal communication patterns, increasing a risk that a biased control condition is generated. In this case, when unknown normal communication occurs due to the operation of the user or the like after the control condition has been determined, over-detection that determines normal communication to be abnormal occurs, and communication control is performed. When such over-detection frequently occurs, the reliability of communication approval and the system may lower, thereby decreasing the safety and convenience in operation.

The disclosed embodiment has been devised in view of the foregoing, and an object is to appropriately control communication of an application on a communication terminal apparatus.

Means for Solving the Problem

In order to solve the problems mentioned above and achieve the above object, a communication terminal apparatus according to the present invention includes processing circuitry configured to collect communication of an application and control the communication of the application based on a first control condition, analyze the communication collected to determine whether the application is a communication control target, and generate the first control condition based on a normal communication range of the application that is the communication control target, and transmit at least a part of first shared information including identification information about the application and the first control condition to a second communication terminal apparatus that is different from the communication terminal apparatus.

Effects of the Invention

The present invention can appropriately control the communication of the application on the communication terminal apparatus.

BRIEF DESCRIPTION OF DRAWINGS

FIG. 3 is a diagram illustrating an example of control conditions.

FIG. 7 is a diagram illustrating application information collected by an analysis unit.

FIG. 8 is a diagram illustrating shared information of the other terminal apparatuses collected by an analysis unit.

FIG. 9 is a diagram illustrating an example of an output screen of a user interface unit.

DESCRIPTION OF EMBODIMENTS

Hereinafter, an embodiment of the present invention will be described in detail with reference to the drawings. The present invention is not limited to the embodiment. Further, in description of the drawings, the same parts are denoted by the same reference signs.

Embodiment In the present embodiment, communication of a connected IoT device using an application on an terminal apparatus as a GW is controlled. Because there are many types of applications on the terminal apparatus, communication of all the applications are not detection targets in the present embodiment. Applications that are communication control targets are classified, and abnormal communication of the classified applications is detected. Further, in the present embodiment, for the applications that are communication control targets, a normal communication pattern is identified to detect abnormal communication, and the detection accuracy of abnormal communication is improved by coordination with other terminal apparatuses.

Figure 1:
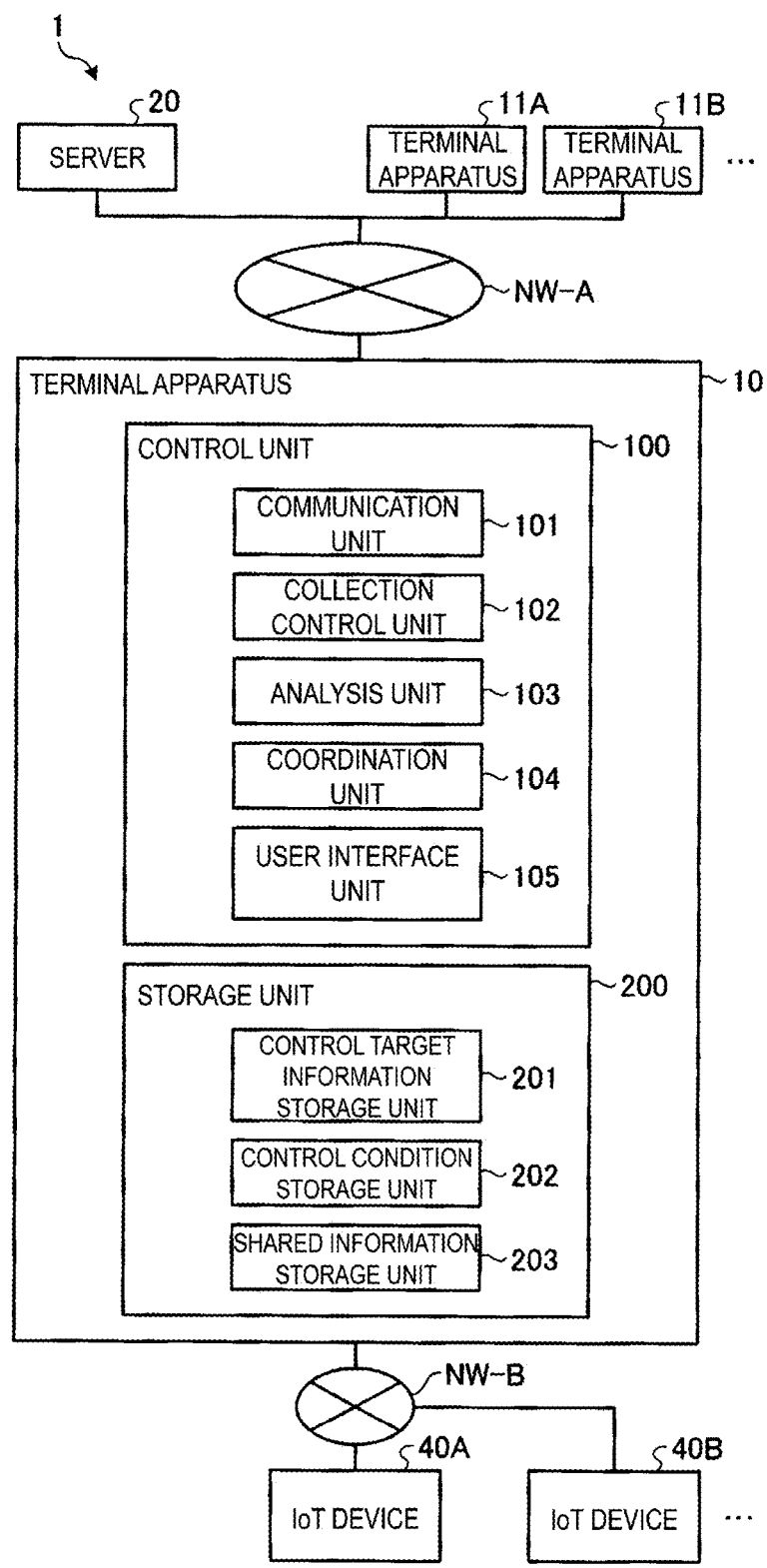
FIG. 1 is a diagram illustrating an example of a configuration of a communication system according to an embodiment.

Example of Configuration of Communication System A communication system according to the embodiment will be described below. FIG. 1 is a diagram illustrating an example of a configuration of a communication system 1 according to the embodiment. The communication system 1 according to the embodiment includes a terminal apparatus 10 (communication terminal apparatus). The terminal apparatus 10 is connected to other terminal apparatuses 11A, 11B, ... and a server 20 via an external network NW-A. The terminal apparatus 10 is connected to IoT devices 40A, 40B, ... via a network NW-B that is different from the external network NW-A.

The terminal apparatus 10 is, for example, a smart phone. The terminal apparatus 10 controls communication between the IoT devices 40A and 40B connected via the network NW-B and external devices connected via the external network NW-A. The terminal apparatus 10 controls communication of each connected IoT device 40 using an application on the terminal apparatus 10 as a GW according to a predetermined communication control condition.

The terminal apparatus 10 classifies applications that are communication control targets, identifies control conditions corresponding to normal communication ranges of the applications that are the communication control targets, and applies the identified control conditions to control communication of the applications. Processing of controlling communication of the application includes detecting application abnormality, blocking communication of the application that causes abnormal communication, and notifying a user and the server 20 of the occurrence of the abnormal communication.

In addition, the terminal apparatus 10 autonomously coordinates with the other terminal apparatuses 11A, 11B, ... to share information without being controlled by a higher-level device (for example, the server 20). For example, the terminal apparatus 10 shares information without any server by using a block chain or the like, in addition to sharing of information via the server through a database or file uploading. The terminal apparatus 10 shares, with the other terminal apparatuses 11A, 11B, ..., information about the application that is the communication control target, control conditions for communication of the application, learning contents in analyzing the communication of the application, and the like.

The terminal apparatuses 11A, 11B, . . . are devices having the same function and configuration as those of the terminal apparatus 10. The terminal apparatuses 11A, 11B, . . . control IoT devices other than the IoT devices 40A, 40B, . . . controlled by the terminal apparatus 10. Note that while FIG. 1 illustrates the two terminal apparatuses 11A and 11B, the number of other terminal apparatuses connected to the terminal apparatus 10 via the external network NW-A is not particularly limited. Hereinafter, when there is no need to distinguish the terminal apparatuses 11A, 11B, . . . , they are collectively described as the terminal apparatuses 11.

The server 20 is an information processor managed by a service provider that provides the terminal apparatus 10. The configuration of the server 20 is not particularly limited. The server 20 may, for example, be one physical server or a virtual server virtually built across a plurality of servers.

The IoT devices 40A, 40B, . . . are devices to be controlled by the terminal apparatus 10. For example, the IoT devices 40A, 40B, . . . each are a sensor such as a temperature sensor, an illuminance sensor, a human sense sensor, and an open/close sensor, which is arranged in a predetermined space and position. For example, the IoT devices 40A, 40B, . . . each are an information processor controlled in terms of power consumption by a corresponding IoT service. For example, the IoT devices 40A, 40B, . . . each are an imaging device that captures an image of a predetermined space and transmits the image to the terminal apparatus 10. Note that while FIG. 1 illustrates the two IoT devices, the number of IoT devices connected to the terminal apparatus 10 is not particularly limited. Hereinafter, when there is no need to distinguish the IoT devices 40A, 40B, . . . , they are collectively described as the IoT devices 40.

The external network NW-A is a communication network that communicatively connects the terminal apparatus 10 to the external devices. The external network NW-A is, for example, the Internet, an intranet, a local area network (LAN), a wide area network (WAN), or the like. The external network NW-A may be a wired network, a wireless network or a combination thereof.

The network NW-B is a communication network that communicatively connects the terminal apparatus 10 to the IoT devices 40A, 40B, . . . . The type of the network NW-B is not particularly limited. The network NW-B may be, for example, the Internet, an intranet, a local area network (LAN), a wide area network (WAN), or the like, or a wired network, a wireless network, or a combination thereof.

Configuration of Terminal Apparatus 10 An example of the configuration and functions of the terminal apparatus 10 will be described with reference to FIG. 1. The terminal apparatus 10 includes a control unit 100 and a storage unit 200.

The control unit 100 controls communication control processing of the terminal apparatus 10. An electronic circuit such as a central processing unit (CPU) or a micro processing unit (MPU) or an integrated circuit such as an application specific integrated circuit (ASIC) or a field programmable gate array (FPGA) may be used as the control unit 100. The control unit 100 includes a storage unit for storing programs and control data that define processing procedures and the like of the terminal apparatus 10. The control unit 100 functions as various processing units by operating various programs.

The storage unit 200 is a storage device that stores various types of data. The storage unit 200 may be a semiconductor memory capable of rewriting data such as a random access memory (RAM), a flash memory, or the like. The device used as the storage unit 200 is not particularly limited.

Description of Various Types of Information First, information used in the communication system 1 according to the present embodiment will be described. A "control condition" is information indicating a normal communication range of each application. The normal communication range is extracted by causing the terminal apparatus 10 to statistically analyze or learn communication of each application from multiple perspectives such as the number of targets of transmission and packet size. In the present embodiment, the "control condition" functions as a so-called whitelist in communication. The "control condition" may also be referred to as a filter condition.

Communication that does not satisfy the "control condition" will be hereinafter referred to as "abnormal communication". In addition, normal communication in a case where communication control based on the "control condition" is not performed is referred to as "steady communication". The "steady communication" can also be referred to as a "normal communication condition", which is a condition for normal communication.

For example, when the number of targets of transmission of an application D to be analyzed (learned) during a predetermined period in which the application D performs the "steady communication" is "1," the control condition "the number of targets of transmission of the application D=1" is obtained. In this case, when the application D attempts to communicate with a plurality of targets of transmission after the terminal apparatus 10 starts control, the terminal apparatus 10 determines that "abnormal communication" of the application D has occurred. In addition, it is assumed that a communication time of an application E to be analyzed (learned) during a predetermined period in which the application E performs the "steady communication" is only a set time set in advance. In this case, the control condition "the communication time of the application E=the set time" is obtained. In this case, when the application E attempts to perform communication outside the set time after the communication system 1 starts control, the terminal apparatus 10 determines that "abnormal communication" of the application E has occurred.

Information Stored in Storage Unit 200 The storage unit 200 includes a control target information storage unit 201, a control condition storage unit 202, and a shared information storage unit 203.

Figure 2:
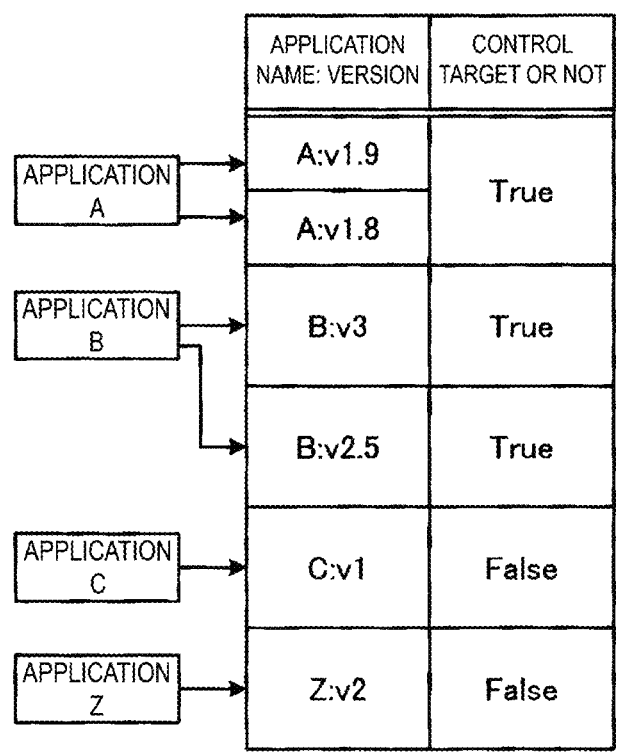
FIG. 2 is a diagram illustrating an example of control target information.

The control target information storage unit 201 stores control target information obtained by associating identification information about each application with information indicating whether or not the application is the communication control target. FIG. 2 is a diagram illustrating an example of the control target information.

As illustrated in FIG. 2, in the control target information, application name and version information is associated with information regarding whether a corresponding application version is the communication control target. "True" indicates that the application version is the communication control target, and "False" indicates that the application version is not the communication control target.

For example, for an application A, the values of "A: v1.9" and "A: v1.8" are "True". Moreover, for an application C, the value of "C: v1" is "False". The control target information is used in a user interface (UI) unit 105 (described below) for visualization, a collection control unit 102 (described below) for communication control, and a coordination unit 104 (described below) for autonomous coordination between terminal apparatuses.

The control condition storage unit 202 stores the control condition for each application. FIG. 3 is a diagram illustrating an example of the control conditions. As illustrated in FIG. 3, each control condition is associated with the application name and version information.

For example, for both "A: v1.9" and "A: v1.8" of the application A, the control condition "packet size {10 kB±20%}, 50 kbyte/packet±50%, protocol={HTTPS}, Duration: {curve y=x$^2$+Sx+2.5}" are stored. This indicates that communication of the application A is considered to fall within the normal communication range when the packet having a size of 10 kB±20% is transmitted. This also indicates that communication of the application A is considered to fall within the normal communication range when each packet has a size of 50±50% kilobytes. This also indicates that communication of the application A is considered to fall within the normal communication range when HTTPS is used as a protocol.

In the example of FIG. 3, for the two versions "v1.9" and "v1.8" of the application A, the same control conditions are associated and stored. Furthermore, because applications C and Z are not control targets, for example, communication patterns cannot be identified due to the user operation. Thus, the applications have no control conditions. The control conditions are used in the UI unit 105 (described below) for visualization, the collection control unit 102 (described below) for communication control, and the coordination unit 104 (described below) for autonomous coordination between the terminal apparatuses.

The shared information storage unit 203 stores shared information that the terminal apparatus 10 shares with the other terminal apparatuses 11. The shared information includes "application name: version" as "Key". The shared information includes, for example, "normal communication conditions (≠ a list of normal communications)" as "Value".

Figure 4:
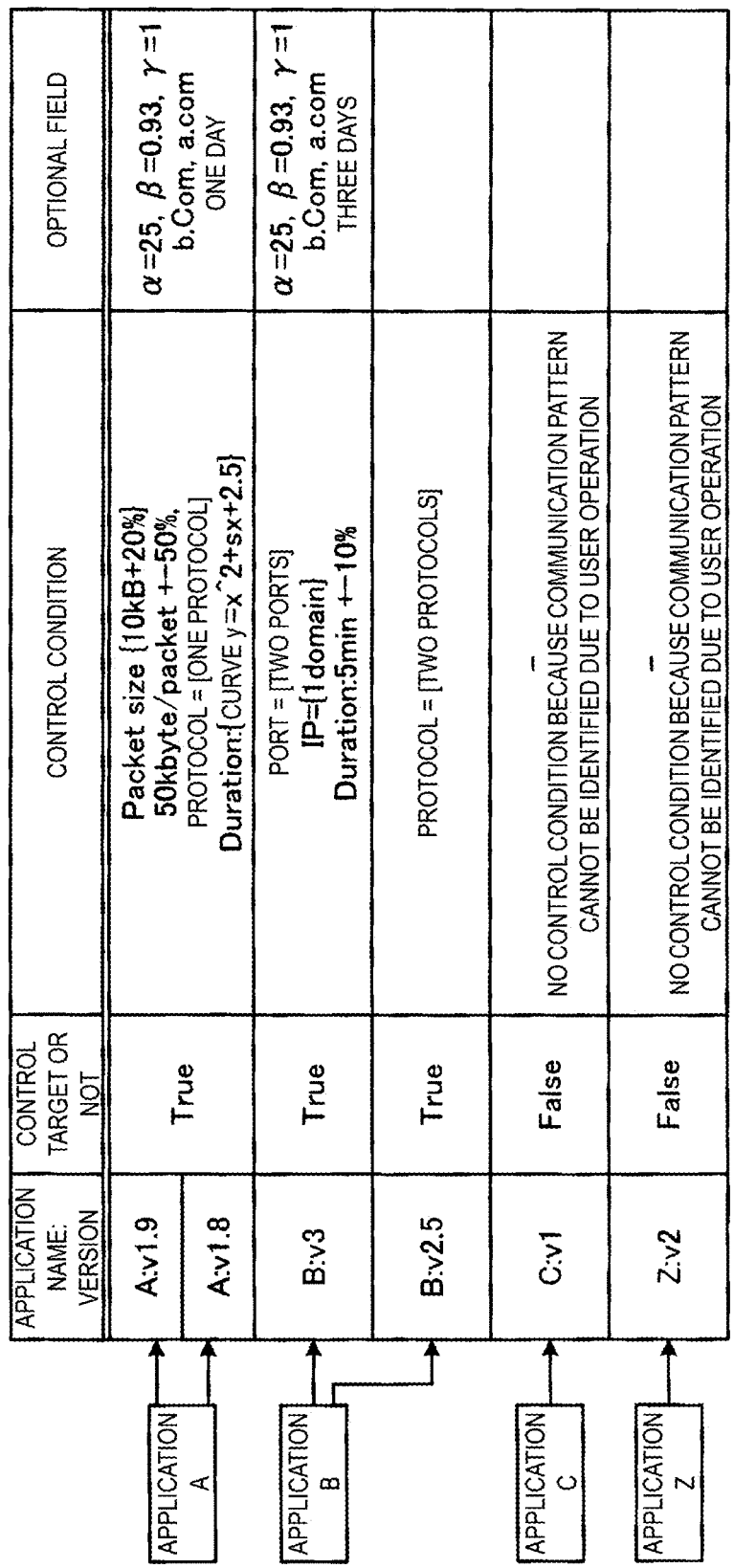
FIG. 4 is a diagram illustrating an example of shared information.

FIG. 4 is a diagram illustrating an example of the shared information. FIG. 4 illustrates an example of the shared information provided to the other terminal apparatuses 11 by the terminal apparatus 10. The shared information storage unit 203 also stores shared information provided from the other terminal apparatuses 11. As illustrated in FIG. 4, the shared information has items of "application name: version," "control target or not", "steady communication (=normal communication condition)", and "optional field".

The item "control target or not" indicates whether or not a corresponding application is the communication control target on the terminal apparatus. "True" indicates that the corresponding application is the communication control target, and "False" indicates that the corresponding application is not the communication control target.

The "steady communication" indicates the normal communication condition in the terminal apparatus 10 that provides the shared information. For contents of the "steady communication", the granularity of the shared information is changed depending on each terminal apparatus 11 to which the shared information is provided. For example, in the case of information sharing to a secure MSS, the accuracy of service can be improved by sharing information necessary for reproducing communication analysis as the contents of the "steady communication" to the maximum extent according to service provisions or the like.

In addition, in the case of server-less sharing or sharing to the public system, only the statistical feature is shared as the contents of the "steady communication", and the specific targets of transmission are concealed. For example, in FIG.

4, no specific protocol name of the application A is indicated, but only the number of protocols is indicated.

The "optional field" includes a value α indicating the difficulty of communication control based on the application information, a value β indicating the easiness of communication control based on the similarity of a learning result of another terminal apparatus, and a value γ indicating whether the application is the control target based on the user operation and recognition. The "optional field" includes device information about the connected IoT devices 40 using the application as the GW. The "optional field" includes the analysis period for the application. In the example of FIG. 4, the analysis period for both "A: v1.9" and "A: v1.8" of the application A is "1 day".

Using the "application name: version" as a search key, the values of the shared information may include the analysis result, the learning condition in analyzing the communication of the application, and the user determination with respect to an alert, in addition to the "normal communication condition".

Note that the timing when the control target information, the control condition, and the shared information are stored and the aspects thereof are not particularly limited. Further, when the user rejects connection and communication for a predetermined application, the storage unit 200 stores information about the fact. When acquiring the shared information from the other terminal apparatuses 11, the storage unit 200 may store, in addition to the information illustrated in FIGS. 2 to 4, information identifying each terminal apparatus 11 that transmits the shared information. The storage unit 200 may store the lengths of the learning periods of the terminal apparatuses 10 and 11 in setting the control target information and the control conditions in association with the control conditions.

Example of Function and Configuration of Each Unit of Control Unit 100 The control unit 100 includes a communication unit 101, a collection control unit 102, an analysis unit 103, a coordination unit 104, and a UI unit 105. The communication unit 101, the collection control unit 102, the analysis unit 103, the coordination unit 104, and the UI unit 105 are installed into the terminal apparatus 10 as communication analysis applications. Communication of an application is not set by the function of the OS, and information about the application is also provided via the communication analysis applications.

The communication unit 101 is a communication interface for achieving communication via the external network NW-A of the terminal apparatus 10. The network communication on the terminal apparatus 10 is made through the communication unit 101 using VPN and Proxy. The communication unit 101 receives information transmitted from the external network NW-A, and, according to predetermined setting, transmits the received information to each of the functional units of the collection control unit 102, the analysis unit 103, the coordination unit 104, and the UI unit 105. According to the predetermined setting, the communication unit 101 transmits, to the outside, the information received from each of the functional units of the collection control unit 102, the analysis unit 103, the coordination unit 104, and the UI unit 105.

The collection control unit 102 collects information about communication of the applications with the IoT devices 40 via the network NW-B. When an application that is not stored in the storage unit 200 is added to the terminal apparatus 10, the collection control unit 102 causes the added application to perform steady communication for a predetermined period, and collects information on the communication. The collection control unit 102 transmits the collected information of the communication along with an instruction to analyze the added application to the analysis unit 103.

The collection control unit 102 controls communication of the application according to a control condition (first condition) set based on a processing result of the analysis unit 103. For example, the collection control unit 102 blocks application communication that does not satisfy the predetermined control condition. For example, the collection control unit 102 detects the application communication that does not satisfy the predetermined control condition and transmits an alert to the user. For example, when the communication that does not satisfy the predetermined control condition occurs, the collection control unit 102 instructs the analysis unit 103 to re-analyze (relearn) the communication of the application generating such communication. In this manner, in the terminal apparatus 10, in order to lower a barrier when the user installs an application, the communication analysis applications analyze and monitor communication of other applications, thereby detecting and controlling fraudulent communication.

The analysis unit 103 receives the application communication collected by the collection control unit 102 from the collection control unit 102. The analysis unit 103 analyzes the received communication to determine whether or not the communicating application is a communication control target. The analysis unit 103 determines whether or not the application is the communication control target based on the application information, the shared information with the other terminal apparatuses 11, which is received by the coordination unit 104 (described below), and a user's answer about whether the application is the communication control target. In addition, the analysis unit 103 determines that an application that increases the number of targets of transmission or an application that changes the communication protocol in response to an operation of the user is not the communication control target because the normal communication condition cannot be generated, and determines that the other applications are the communication control targets.

Then, the analysis unit 103 generates a control condition (first condition) for the application to be analyzed based on the normal communication range of the application that is the communication control target. The analysis unit 103 identifies the normal communication range of the application that is the communication control target by using a statistical technique or machine learning. The set control condition and learning condition are stored in the storage unit 200.

Based on an instruction from the collection control unit 102, the analysis unit 103 re-analyzes (relearns) the communication of the application causing the communication that does not satisfy the control condition. The analysis unit 103 receives the application communication that does not satisfy the control condition from the collection control unit 102, and performs re-analysis to set the control condition. Note that in setting and re-analyzing the control condition, the analysis unit 103 can refer to the shared information generated by the terminal apparatus 10 and the shared information acquired from the other terminal apparatuses 11. The control condition set by the analysis unit 103 is stored in the storage unit 200 according to the setting and transmitted to each of the functional units.

The coordination unit 104 shares the application control condition set based on the analysis result of the analysis unit 103 with the other terminal apparatuses 11. In addition, the coordination unit 104 shares the application control condition set on the other terminal apparatuses 11 with the other terminal apparatuses 11. In other words, the coordination unit 104 receives at least a part of second shared information including identification information about an application on the other terminal apparatuses 11, information indicating whether or not the application is the communication control target, a control condition (second control condition) corresponding to the normal communication condition of the application, and the analysis result for the application. The second shared information is set in the other terminal apparatuses 11.

Here, the term "share" means that the terminal apparatus 10 can refer to application information including information regarding whether the application is the control target in other terminal apparatuses 11, the control condition, and the like, and the other terminal apparatuses 11 can refer to application information including information regarding whether the application is the control target in the terminal apparatus 10, the control condition, and the like.

Note that the analysis unit 103 can also refer to the normal communication condition and the optional field of the shared information received by the coordination unit 104 from the other terminal apparatuses 11 by using the identification information about the application as a key. The analysis unit 103 presents, to the user, the contents of the acquired normal communication range or the referred contents of the normal communication condition and the optional field in the other terminal apparatuses 11, and adjusts the analysis contents and control condition for the application to be analyzed based on the user's answer.

The coordination unit 104 generates shared information from information such as identification information about an application for which the control condition is set on the terminal apparatus 10, and control conditions thereof. The coordination unit 104 changes, according to a sharing condition of the shared information with the other terminal apparatuses 11, the granularity of information about the sharing condition. In addition, the coordination unit 104 selects information to be included in the shared information according to the sharing condition of the shared information with the terminal apparatuses 11.

For example, the coordination unit 104 shares information via a server through DB or file uploading. The sharing via the server is used when an operation of an MSS or information correction support is needed. In the case of information sharing with the secure MSS, information necessary for reproducing communication analysis may be shared as contents of the control condition to the maximum extent according to service provisions and the like. In other words, the coordination unit 104 increases the granularity of information to be shared according to the security condition of the service provider.

In addition, in the case of server-less sharing such as a blockchain or sharing to the public system, the coordination unit 104 shares only the statistical feature as the contents of the control condition, and conceals the specific target of transmission. For example, assuming that server-less sharing is also used to avoid centralized control (such as governmental communication regulations), a measure of not sharing highly confidential information such as a destination address is taken in the coordination unit 104.

Then, the coordination unit 104 transmits part or all of the shared information to the other terminal apparatuses 11. The coordination unit 104 also receives part or all of the shared information from the other terminal apparatuses 11. The sharing mode is not particularly limited. For example, the shared information may be transmitted to the other terminal apparatuses 11 each time a part of the shared information is identified on the terminal apparatus 10, or in response to a request from the other terminal apparatuses 11. Furthermore, all or a part of the shared information may be transmitted.

The UI unit 105 provides various types of information to the user and receives an input from the user. The UI unit 105 may include, for example, a liquid crystal screen, a touch panel, a speaker, a microphone, or the like.

The UI unit 105 presents, to the user, the application information and the shared information about the application, which is provided from the other terminal apparatuses 11 and receives the user's answer regarding whether the application to be analyzed is the communication control target. For example, the UI unit 105 displays, to the user, analysis contents of the application on the own terminal apparatus by the analysis unit 103 and analysis contents of the applications in the other terminal apparatuses 11 so as to compare the contents with each other.

The UI unit 105 also notifies the user of information about the application causing communication that deviates from the control condition. When the communication deviating from the control condition occurs, the UI unit 105 transmits a notification indicating the fact to the user, and displays a screen requesting the user to confirm whether or not it is over-detection.

Figure 5:
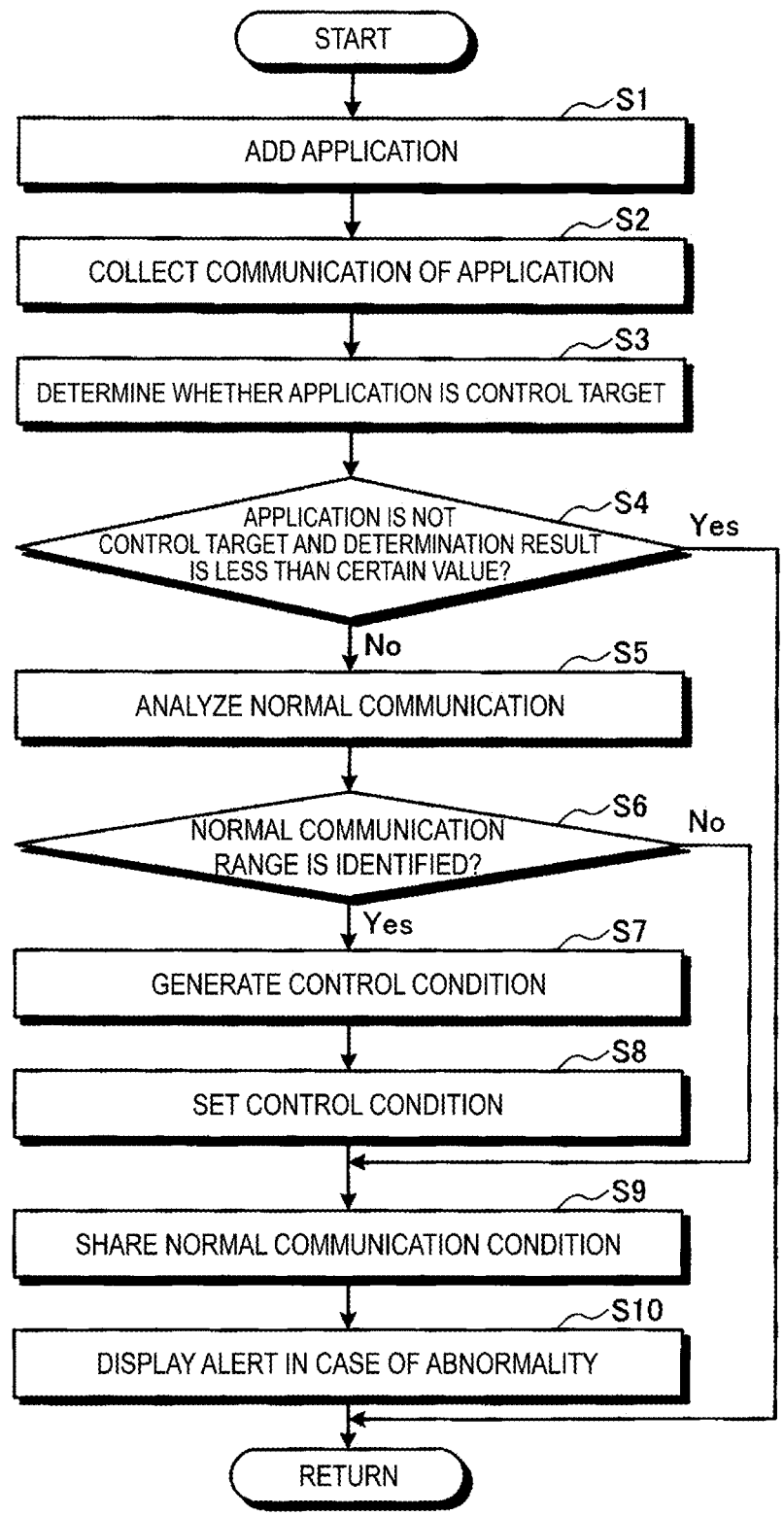
FIG. 5 is a flowchart of an example of processing in a communication system according to the embodiment.

Procedure of Communication Control Processing FIG. 5 is a flowchart of an example of processing in the communication system 1 according to the embodiment. In the communication system 1, when a new application is added to the terminal apparatus 10 (Step S1), the collection control unit 102 causes the new application to try steady communication, intermediates the communication, collects communication information (Step S2), and requests the analysis unit 103 to analyze the communication.

The analysis unit 103 determines whether or not the added application is the communication control target (Step S3). The analysis unit 103 determines whether the added application is the control target based on application information such as application name. The analysis unit 103 determines whether the added application is the control target based on the analysis result of the shared information with the other terminal apparatuses 11, which is acquired by the coordination unit 104. Then, the analysis unit 103 determines whether the added application is the control target based on the user's answer regarding whether the added application is the communication control target. The analysis unit 103 calculates a predetermined determination formula to which the application information, the shared information, and the answer of the user are applied.

When the added application is not the communication control target and the determination calculation result is less than a certain value (Step S4: Yes), the control unit 100 determines that the added application is not the communication control target and terminates the processing.

In addition, when the added application is the communication control target or the determination calculation result is the certain value or more (Step S4: No), the analysis unit 103 uses a statistical technique or machine learning to perform normal communication analysis for determining the normal communication range of the application that is the communication control target (Step S5). The analysis unit 103 uses confidence interval, counting, principal component analysis (PCA), or the like as the statistical technique to identify a communication pattern, and when the number of the patterns does not increase with an increase in time, defines the pattern as the normal communication condition.

When the normal communication range is identified (Step S6: Yes), the analysis unit 103 generates the control condition for the application based on the normal communication range (Step S7). The analysis unit 103 outputs the analysis result, the normal communication range, and the control condition to the storage unit.

Then, the analysis unit 103 sets the generated control condition in the collection control unit 102 as the control condition for the added application (Step S8). This causes the collection control unit 102 to control the communication of the added application according to the set control condition. The collection control unit 102 takes statistics of the communication using the same technique as the generation of the control condition, and determines communication other than the normal communication range to be abnormal. For example, the collection control unit 102 blocks application communication that does not satisfy the predetermined control condition.

When the normal communication range is not identified (Step S6: No) or after the processing in Step S8, the coordination unit 104 transmits the normal communication condition identified by the analysis unit 103 to the other terminal apparatuses 11 and shares the normal communication condition with the other terminal apparatuses (Step S9).

Then, when detecting communication of the application that does not satisfy the predetermined control condition, the collection control unit 102 displays an alert to the user to visualize the control condition and handling (Step S10).

Figure 6:
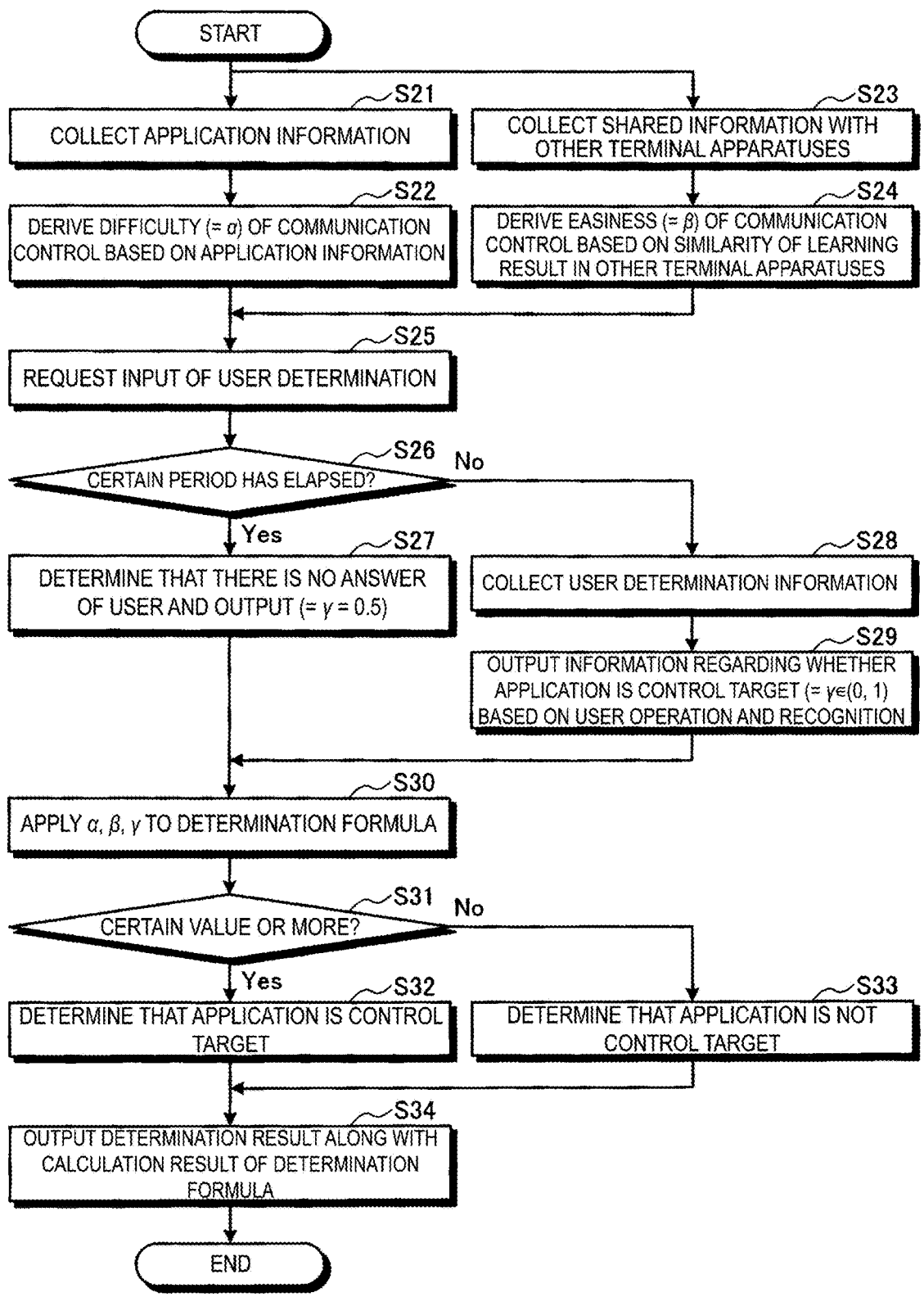
FIG. 6 is a flowchart of processing of determining a communication control target according to the embodiment.

Determination of Communication Control Target Next, processing of determining the communication control target by the analysis unit 103 will be described. FIG. 6 is a flowchart of processing of determining the communication control target according to the embodiment.

As illustrated in FIG. 6, the analysis unit 103 analyzes application communication collected by the collection control unit 102 to collect application information (Step S21).

FIG. 7 is a diagram illustrating the application information collected by the analysis unit 103. As illustrated in FIG. 7, the analysis unit 103 collects the presence or absence of application advertisement, the presence or absence of background communication, and the presence or absence of notification, which are the application information, as conditions for giving points, gives points when each condition is satisfied, and calculates a total point. For example, in the example of FIG. 7, in the application to be analyzed, all conditions regarding the application advertisement, the background communication, and the notification are satisfied, and points corresponding to each condition are given. As a result, the total point is determined to be 25. Based on this total point, the analysis unit 103 derives a coefficient $\alpha$ indicating the difficulty in communication control based on the application information (Step S22).

The analysis unit 103 executes Steps S23 and 24 in parallel with Steps S21 and 22. The analysis unit 103 collects the shared information with the other terminal apparatuses 11 by autonomous coordination (Step S23).

FIG. 8 is a diagram illustrating the shared information with the other terminal apparatuses 11 collected by the analysis unit 103. As illustrated in FIG. 8, the analysis unit 103 acquires, as the shared information, identification information about the connected device using the application to be analyzed as the GW, information regarding whether the device is the control target, and the target of transmission in the normal range, and acquires a learning result of the other terminal apparatuses 11. Then, the analysis unit 103 derives a coefficient $\beta$ indicating the easiness of communication control based on the similarity of the learning result in the other terminal apparatuses 11 (Step S24). The similarity takes values from 0 to 1 by a vector space method or the like.

The analysis unit 103 causes the UI unit 105 to present, to the user, the application information and the shared information about the application, which is provided from the other terminal apparatuses 11 and requests the user to input determination regarding whether the application to be analyzed is the communication control target (Step S25).

FIG. 9 is a diagram illustrating an example of an output screen of the UI unit 105. As illustrated in FIG. 9, the screen displays the determination difficulty based on the application information, which is determined using the coefficient $\alpha$, determination in the autonomous coordination using the coefficient $\beta$, and user determination. In this case, a ground to determine whether the application is the communication control target and messages to the user are displayed in remarks. The user selects whether or not the application to be analyzed is the communication control target, and inputs an answer to the UI unit 105.

When the user does not answer even after an elapse of a certain time after the processing in Step S25 (Step S26: Yes), the analysis unit 103 determines that there is no answer of the user, and outputs $\gamma=0.5$ as a result $\gamma$ of determining whether the application is the communication control target based on the user's operation and recognition (Step S27).

In addition, when the user answers before an elapse of a certain time (Step S26: No), the analysis unit 103 acquires the information about the user's determination regarding whether the application is the communication control target (Step S28). Then, in response to the answer of the user, the analysis unit 103 outputs a value of $\gamma$ (Step S29). When the user determines that the application to be analyzed is the communication control target, the analysis unit 103 outputs $\gamma=1$. When the user determines that the application to be analyzed is not the communication control target, the analysis unit 103 outputs $\gamma=0$.

Then, the values of $\alpha$, $\beta$, and $\gamma$ are applied to a determination formula defined by the user, and calculation is performed (Step S30). The analysis unit 103 may assign weights to $\alpha$, $\beta$, and $\gamma$ and then apply the weighted values to the determination formula. The weighting to $\alpha$, $\beta$, and $\gamma$ and determination formula vary depending on usage scenes such as official use, private use, and usage rules and thus, are set by the service provider. The determination formula is also modified as appropriate according to the given points in collecting the application information, the granularity of information in autonomous coordination, the rate and accuracy of answer of the user. For example, when "$(-0.01\alpha+\beta)\gamma$" is used as the determination formula and the calculation result is a certain value (e.g. 0.3) or more, it is determined that the application is the communication control target.

When the calculation result in Step S30 is the certain value or more (Step S31: Yes), the analysis unit 103 determines that the application to be analyzed is the communication control target (Step S32). When the calculation result in Step S30 is less than the certain value (Step S31: No), it is determined that the application to be analyzed is not the communication control target (Step S33). The analysis unit 103 outputs the determination result along with the calculation result of the determination formula (Step S34).

Figure 10:
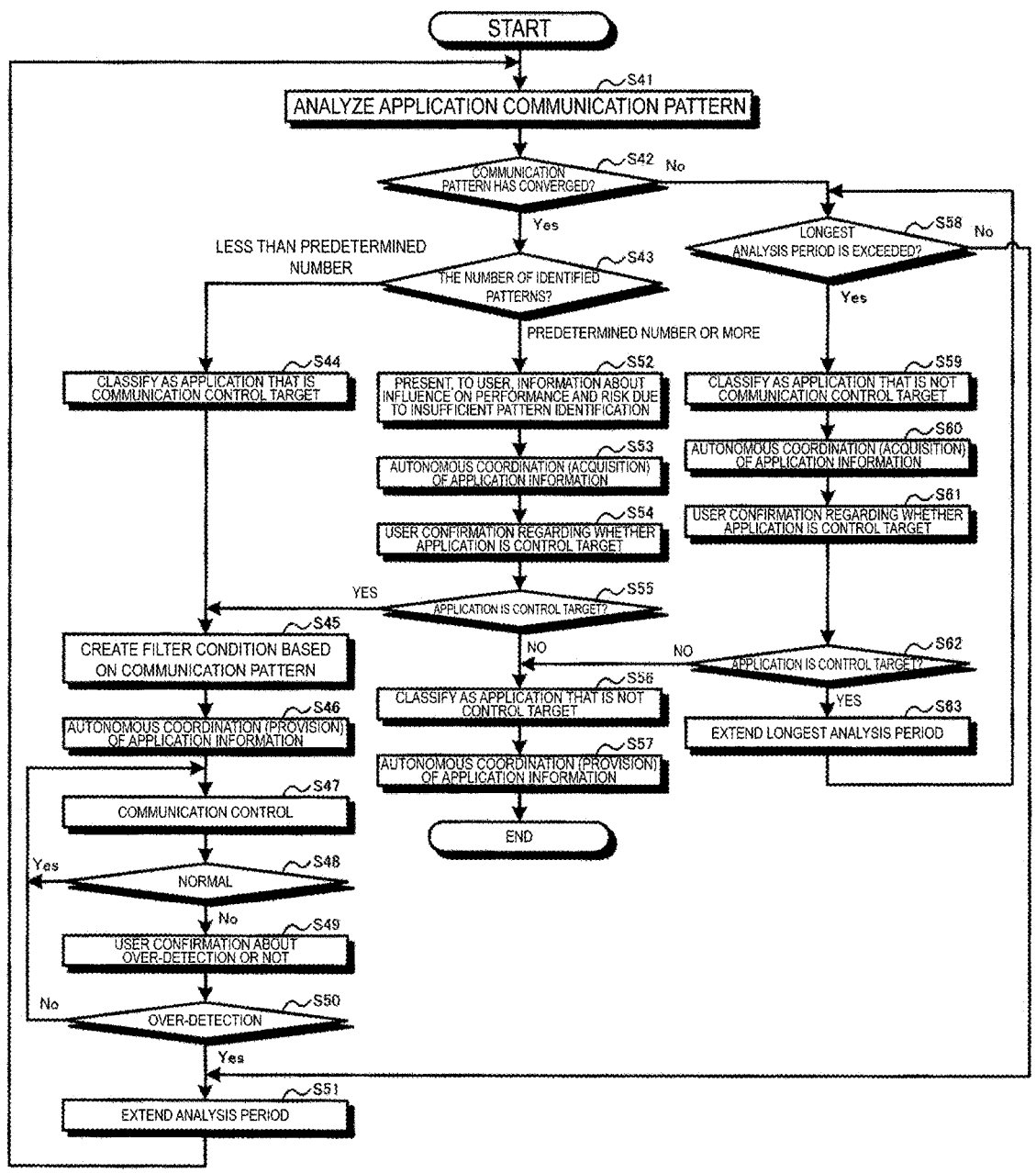
FIG. 10 is a flowchart of processing of analyzing normal communication according to the embodiment.

Analysis of Normal Communication Next, processing of analyzing normal communication by the control unit 100 will be described. FIG. 10 is a flowchart of processing of analyzing the normal communication according to the embodiment.

As illustrated in FIG. 10, assuming that there is regularity (pattern) in communication for each application, the analysis unit 103 analyzes the application communication pattern (Step S41). It is known that the IoT devices 40 often perform communication only in a certain communication pattern. In the case where the application on the terminal apparatus 10 functions as the GW of the IoT, it is expected that the communication patterns of the application can be narrowed. In the case of general applications used for certain use, abnormal communication can be also detected based on the communication pattern. In particular, when the application on the terminal apparatus is fraudulently operated, for example, by a remote attack, there is a high possibility that an abnormal communication pattern occurs.

Thus, in Step S41, the analysis unit 103 collects communication characteristics to perform statistical analysis or machine learning from multiple perspectives such as the number of targets of transmission, packet size, and the number of times of communication, thereby analyzing the communication pattern of the application.

Then, the analysis unit 103 determines whether or not the analyzed communication pattern has converged (Step S42). The analysis unit 103 fits a change in cumulative value of the communication pattern to a curve using time or communication amount as variables, and calculates a convergence ratio at a time or a communication amount based on the calculated parameter. Then, when the calculated convergence ratio is a predetermined value or more, the analysis unit 103 determines that the communication pattern has converged. In addition, when the calculated convergence ratio is less than the predetermined value, the analysis unit 103 determines that the communication pattern has not converged. For the application in which the communication pattern has not converged, the terminal apparatus 10 classifies the application as the non-communication control target by executing processing described below, thereby preventing unnecessary statistics or learning and reducing calculation costs.

When the communication pattern has converged (Step S42: Yes), the analysis unit 103 determines whether the number of identified patterns is less than a predetermined number (Step S43). The identified pattern indicates a pattern identified in terms of the target of transmission, the number of targets of transmission, the range (size) of communication, the period, and the like. Then, the predetermined number in Step S43 is set according to the load of the CPU.

When determining that the number of identified patterns is less than the predetermined value (Step S43: less than the predetermined value), the analysis unit 103 classifies the application as the communication-controllable application (Step S44), and creates a filter condition (control condition) based on the communication pattern (Step S45).

The coordination unit 104 creates shared information about the own apparatus based on the information about the application classified as the non-communication control target, and the statistical result, the machine learning result, the filter condition, and the like of the application, which are acquired by the analysis unit 103. Then, after adjusting the sharing condition according to the security condition, the coordination unit 104 provides the shared information to the other terminal apparatuses 11 for autonomous coordination of the application information (Step S46).

The collection control unit 102 controls the communication of the application according to the filter condition (Step S47) and determines whether or not the communication is the normal communication (Step S48). When detecting abnormal communication (Step S48: No), the collection control unit 102 causes the UI unit 105 to display a screen requesting the user to confirm whether or not the abnormality detection is over-detection, and acquires a user confirmation result related to the over-detection (Step S49). When the user confirms that the abnormality detection is over-detection (Step S50: Yes), the collection control unit 102 extends an analysis period (Step S51), and requests the analysis unit 103 to re-analyze the communication of the application.

On the contrary, when the user confirms that the abnormality detection is not over-detection (Step S50: No), the collection control unit 102 blocks the communication of the application and notifies the occurrence of abnormal communication, and returns to Step S47. When the communication is normal communication (Step S48: Yes), the collection control unit 102 returns to Step S47.

When determining that the number of identified patterns is the predetermined number or more (Step S43: the predetermined number or more), the analysis unit 103 causes the UI unit 105 to present, to the user, information that the application to be analyzed may have influence on performance and has a risk due to insufficient identification of the communication pattern (Step S52). Then, the analysis unit 103 acquires the shared information of the other terminal apparatuses 11 for autonomous coordination of the application information via the coordination unit 104 (Step S53). The analysis unit 103 causes the UI unit 105 to display the analysis conditions and analysis results in the other terminal apparatuses 11 such that the user can compare the analysis contents regarding the application in the other terminal apparatuses 11 with the analysis contents regarding the application in the own apparatus. The analysis unit causes the UI unit to display a result regarding whether the application is the communication control target.

The analysis unit 103 causes the UI unit 105 to display a screen requesting the user to input information regarding whether the application to be analyzed is the communication control target, and acquires a user confirmation result about whether the application to be analyzed is the communication control target (Step S54).

When the user allows the application to be analyzed as the communication control target (Step S55: Yes), the analysis unit 103 creates a filter condition (control condition) based on the communication pattern of the application (Step S45).

When the user does not allow the application to be analyzed as the communication control target (Step S55: No), the analysis unit 103 classifies the application as the application that is not the communication control target (Step S56). For autonomous coordination of the application information, the coordination unit 104 creates, in the other terminal apparatuses 11, shared information about the application classified as the non-communication control target in the own terminal apparatus and provides the shared information to the other terminal apparatuses 11 (Step S57).

On the contrary, when the communication pattern has not converged (Step S42: No), the analysis unit 103 determines whether or not a longest analysis period has been exceeded (Step S58). When the longest analysis period has not been exceeded (Step S58: No), the analysis unit 103 extends the analysis period (Step S51) and continues to analyze the communication of the application.

When the longest analysis period has exceeded (Step S58: Yes), the analysis unit 103 classifies the application to be analyzed as the application that is not the communication control target (Step S59). Then, the analysis unit 103 acquires the shared information with the other terminal apparatuses 11 via the coordination unit 104 (Step S60). Then, in order to cause the user to check the difference between the analysis contents of the other terminal apparatuses 11 and the analysis contents of the own apparatus, the analysis unit 103 causes the UI unit 105 to display the acquired shared information. For example, the UI unit 105 displays information indicating whether or not the other terminal apparatuses 11 have completed analysis of the communication of the application, or an analysis period of the communication of the application in the other terminal apparatuses 11. In this way, the terminal apparatus 10 does not use an external whitelist as it is and proceeds processing after the confirmation by the user. Thus, more appropriate control condition can be set in the terminal apparatus 10.

The analysis unit 103 causes the UI unit 105 to display a screen requesting the user to enter information regarding whether the application to be analyzed is the communication control target, and acquires a user confirmation result about whether the application to be analyzed is the communication control target (Step S61).

When the user allows the application to be analyzed as the communication control target (Step S62: Yes), the analysis unit 103 extends the longest analysis period (Step S63) and returns to Step S58. When the user does not allow the application to be analyzed as the communication control target (Step S62: No), the analysis unit 103 classifies the application as the application that is not the communication control target (Step S56). For autonomous coordination of the application information, the coordination unit 104 creates, in the other terminal apparatuses 11, shared information about the application classified as the non-communication control target in the own terminal apparatus and provides the shared information to the other terminal apparatuses 11 (Step S57).

Effect of Embodiment In this way, the terminal apparatus 10 according to the embodiment collects the communication of the application and controls the communication of the application based on the first control condition. The terminal apparatus 10 analyzes the collected communication to determine whether the application is the communication control target, and generates the first control condition based on the normal communication range of the application that is the communication control target. The terminal apparatus 10 transmits at least a part of first shared information including the application identification information and the first control condition to the other communication terminal apparatuses.

Thus, the terminal apparatus 10 according to the embodiment can achieve control based on the communication status of each application without relying on external information. Accordingly, even when abnormal communication occurs in the present embodiment due to fraudulent operation of the application on the terminal apparatus 10, the abnormal communication can be detected and handled. In other words, the present embodiment enables appropriate control of the communication of the application on the terminal apparatus 10. In this embodiment, the collection control unit 102, the analysis unit 103, the coordination unit 104, and the UI unit 105 can function as the communication analysis applications to analyze and monitor the communication of other applications, and to detect and control fraudulent communication, thereby lowering a barrier when the user installs the application.

Further, the terminal apparatus 10 according to the embodiment changes, according to the sharing condition of the shared information with the other terminal apparatuses 11, the granularity of the shared information. In addition, the coordination unit 104 selects information to be included in the shared information according to the sharing condition of the shared information with the other communication terminal apparatuses. In other words, in the present embodiment, the shared information is protected by adjusting the granularity of the shared information and not sharing highly confidential information according to the security condition of the service provider.

The terminal apparatus 10 according to the embodiment receives at least a part of the second shared information including identification information about an application on the other communication terminal apparatuses, information indicating whether or not the application is the communication control target, a second control condition corresponding to the normal communication condition of the application, and a analysis result for the application. The second shared information is set in the other terminal apparatuses 11. The terminal apparatus 10 according to the embodiment causes the UI unit 105 to present, to the user, the application information, the analysis result by the analysis unit, or the second shared information about the application, and receives the user's answer regarding whether the application is the communication control target.

The terminal apparatus 10 determines whether or not the application is the communication control target based on the application information, the analysis result by the analysis unit, the second shared information received by the coordination unit, and the user's answer.

Accordingly, the terminal apparatus 10 performs classification, determining whether the application is the communication control target in a semi-automatic manner. The terminal apparatus 10 allows the user to compare the analysis contents in the own terminal apparatus with the analysis contents in the other terminal apparatuses 11, and determine processing for the application to be analyzed.

In addition, since the terminal apparatus 10 visualizes the communication occurring in the application and presents the visualized communication to the user, the user can confirm the communication control of the application. In particular, in the present embodiment, when the application on the terminal apparatus is fraudulently operated by a remote attack or the like, it is possible to visualize an unknown abnormal communication pattern, present the visualized communication pattern to the user, and appropriately control the communication according to the user's answer.

Further, the terminal apparatus 10 according to the embodiment uses a statistical technique or machine learning to collect communication patterns of the applications that are the communication control targets, and classifies the application whose communication pattern has not converged as the application that is not the communication control target.

In this manner, the terminal apparatus 10 removes the application whose communication pattern has not converged due to an operation of the user via a browser or the like, from the communication control target, to achieve efficient communication control. Further, the terminal apparatus 10 classifies the application whose communication pattern has converged as the application that is the communication control target to identify the normal communication range. In this manner, the terminal apparatus 10 can classify the application whose communication pattern has converged as the communication control target to identify the normal communication pattern, thereby appropriately identifying the normal communication range. Thus, it is possible to increase the accuracy of the control condition for detecting abnormality.

As described above, the embodiment enables visualization of communication occurring in the application and control of fraudulent communication. Furthermore, the present embodiment can share the control logic with the other terminal apparatuses 11, increasing the accuracy of detection and control.

System Configuration, or the Like The respective components of the respective devices illustrated are functional and conceptual components, and are not necessarily physically configured as illustrated. That is, a specific form of distribution and integration of the respective devices is not limited to the illustrated form, and all or a portion thereof can be configured to be functionally or physically distributed and integrated in any units according to various loads, use situations, and the like. Further, all or some of processing functions performed by each device may be implemented by a CPU and a program that is analyzed and executed by the CPU, or may be implemented as hardware based on a wired logic.

All or some of processes described as being performed automatically among the processes described in the embodiments may be performed manually or all or some of processes described as being performed manually may be performed automatically according to a known method. In addition, information including the processing procedures, control procedures, specific names, and various types of data or parameters described above or illustrated in the drawings can be freely changed unless otherwise specified.

Figure 11:
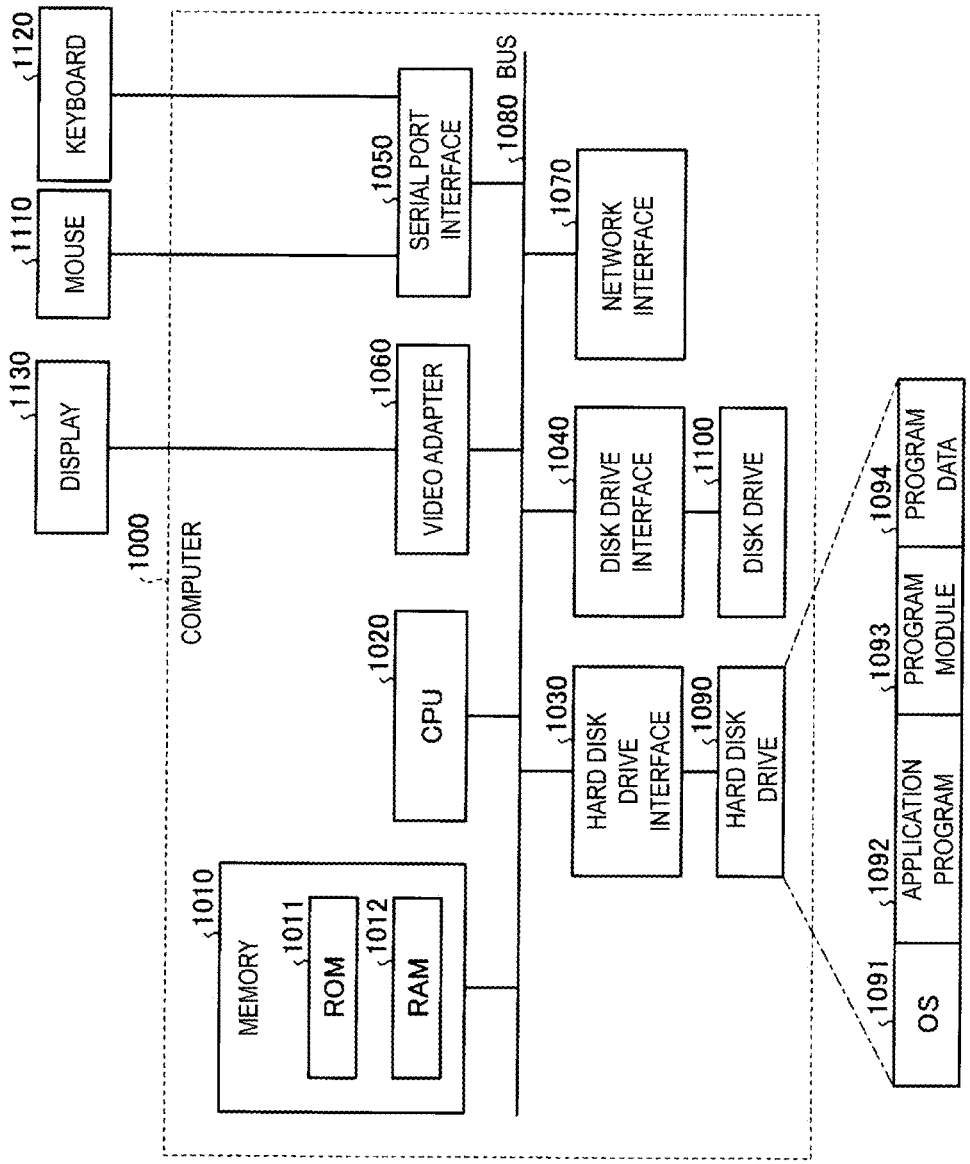
FIG. 11 is a diagram illustrating an example of a computer that implements a terminal apparatus according to the embodiment by executing a program.

Program FIG. 11 is a diagram illustrating an example of a computer that achieves the terminal apparatuses 10 and 11 by executing a program. A computer 1000 includes, for example, a memory 1010 and a CPU 1020. Further, the computer 1000 includes a hard disk drive interface 1030, a disk drive interface 1040, a serial port interface 1050, a video adapter 1060, and a network interface 1070. These units are connected by a bus 1080.

The memory 1010 includes a ROM 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. A detachable storage medium such as a magnetic disk or optical disk, for example, is inserted into the disk drive 1100. The serial port interface 1050 is connected to, for example, a mouse 1110 and a keyboard 1120. The video adapter 1060 is connected to a display 1130, for example.

The hard disk drive 1090 stores, for example, an operating system (OS) 1091, an application program 1092, a program module 1093, and program data 1094. That is, a program defining each processing operation of the terminal apparatuses 10 and 11 is implemented as the program module 1093 in which a computer-executable code is written. The program module 1093 is stored in, for example, the hard disk drive 1090. For example, the program module 1093 for executing the same processing as the functional configuration in the terminal apparatuses 10 and 11 is stored in the hard disk drive 1090. The hard disk drive 1090 may be replaced with a solid state drive (SSD).

Further, setting data used in the process of the embodiment described above is stored as the program data 1094 in the memory 1010 or the hard disk drive 1090, for example. The CPU 1020 reads the program module 1093 or the program data 1094 stored in the memory 1010 or the hard disk drive 1090 into the RAM 1012 as necessary, and executes the program module 1093 or the program data 1094.

The program module 1093 or the program data 1094 is not limited to being stored in the hard disk drive 1090, and may be stored, for example, in a detachable storage medium and read by the CPU 1020 via the disk drive 1100 or the like. Alternatively, the program module 1093 and the program data 1094 may be stored in another computer connected via a network (LAN, a wide area network (WAN), or the like). The program module 1093 and the program data 1094 may be read from another computer via the network interface 1070 by the CPU 1020.

Although embodiments to which the invention made by the present inventor has been applied have been described above, the present invention is not limited to the description and the drawings that form part of the disclosure of the present invention according to the embodiments. That is, all other embodiments, examples, operation techniques, and the like made by those skilled in the art on the basis of the present embodiments are included in the scope of the present invention.

REFERENCE SIGNS LIST

1 Communication system
10 Terminal apparatus
11, 11A, 11B Other terminal apparatus
100 Control unit
101 Communication unit
102 Collection control unit
103 Analysis unit
104 Coordination unit
105 User interface (UI) unit
20 Server
40, 40A, 40B IoT device
NW-A External network
NW-B Network
200 Storage unit
201 Control target information storage unit
202 Control condition storage unit
203 Shared information storage unit

The invention claimed is:

1. A communication terminal apparatus comprising:
processing circuitry configured to:
  collect communication of an application and control the communication of the application based on a first control condition, wherein the first control condition includes a packet size and a number of targets of transmission;
  analyze the communication collected to determine whether the application is a communication control target, and generate the first control condition based on a normal communication range of the application that is the communication control target;
  transmit first shared information including identification information about the application and the first control condition to a second communication terminal apparatus that is different from the communication terminal apparatus;
  receive second shared information including identification information about an application on the second communication terminal apparatus, information indicating whether the application is the communication control target, a second control condition corresponding to a normal communication condition of the application, and an analysis result for the application, wherein the second shared information is set by the second communication terminal apparatus; and
  when communication that does not satisfy the first control condition occurs, perform re-analysis to set the first control condition by referring to the first shared information and the second shared information, and re-analyze the communication of the application generating the communication.

2. The communication terminal apparatus according to claim 1, wherein the processing circuitry is further configured to change a granularity of the first shared information according to a sharing condition for the first shared information with the second communication terminal apparatus, and select information to be included in the first shared information according to the sharing condition for the first shared information with the second communication terminal apparatus.

3. The communication terminal apparatus according to claim 1, wherein the processing circuitry is further configured to:
  present, to a user, information about the application, the analysis result, or the second shared information about the application, and receive an answer of the user regarding whether the application is the communication control target, and
  determine whether the application is the communication control target based on the information about the application, the analysis result, the second shared information received, and the answer of the user.

4. The communication terminal apparatus according to claim 1, wherein the processing circuitry is further configured to use a statistical technique or machine learning to collect communication patterns of the application that is the communication control target, classify the application whose communication pattern has not converged as the application that is not the communication control target, and classify the application whose communication pattern has converged as the application that is the communication control target to identify the normal communication range.

5. A communication control method performed by a communication terminal apparatus, the communication control method comprising:
  collecting communication of an application and controlling the communication of the application based on a first control condition, wherein the first control condition includes a packet size and a number of targets of transmission;
  analyzing the communication collected in the collecting and the controlling to determine whether the application is a communication control target, and generating the first control condition based on a normal communication range of the application that is the communication control target;
  performing coordination by transmitting first shared information including identification information about the application and the first control condition to a second communication terminal apparatus that is different from the communication terminal apparatus;
  receiving second shared information including identification information about an application on the second communication terminal apparatus, information indicating whether the application is the communication control target, a second control condition corresponding to a normal communication condition of the application, and an analysis result for the application, wherein the second shared information is set by the second communication terminal apparatus; and
  when communication that does not satisfy the first control condition occurs, performing re-analysis to set the first control condition by referring to the first shared information and the second shared information, and re-analyzing the communication of the application generating the communication.

6. A non-transitory computer-readable recording medium storing therein a communication control program that causes a computer to execute a process comprising:
  collecting communication of an application and controlling the communication of the application based on a first control condition, wherein the first control condition includes a packet size and a number of targets of transmission;
  analyzing the communication collected in the collecting and the controlling to determine whether the application is a communication control target, and generating the first control condition based on a normal communication range of the application that is the communication control target;
  performing coordination by transmitting first shared information including identification information about the application and the first control condition to a second communication terminal apparatus that is different from a communication terminal apparatus;
  receiving second shared information including identification information about an application on the second communication terminal apparatus, information indicating whether the application is the communication control target, a second control condition corresponding to a normal communication condition of the application, and an analysis result for the application, wherein the second shared information is set by the second communication terminal apparatus; and
  when communication that does not satisfy the first control condition occurs, performing re-analysis to set the first control condition by referring to the first shared information and the second shared information, and re-analyzing the communication of the application generating the communication.

7. The communication terminal apparatus according to claim 1, wherein the application is a smartphone application.

8. The communication terminal apparatus according to claim 1, wherein the first control condition includes a condition that a protocol is HTTPS.

9. The communication control method according to claim 5, wherein the application is a smartphone application.

10. The communication control method according to claim 5, wherein the first control condition includes a condition that a protocol is HTTPS.

11. The non-transitory computer-readable recording medium according to claim 6, wherein the application is a smartphone application.

12. The non-transitory computer-readable recording medium according to claim 6, wherein the first control condition includes a condition that a protocol is HTTPS.

* * * * *